United States Patent Office 3,817,834
Patented June 18, 1974

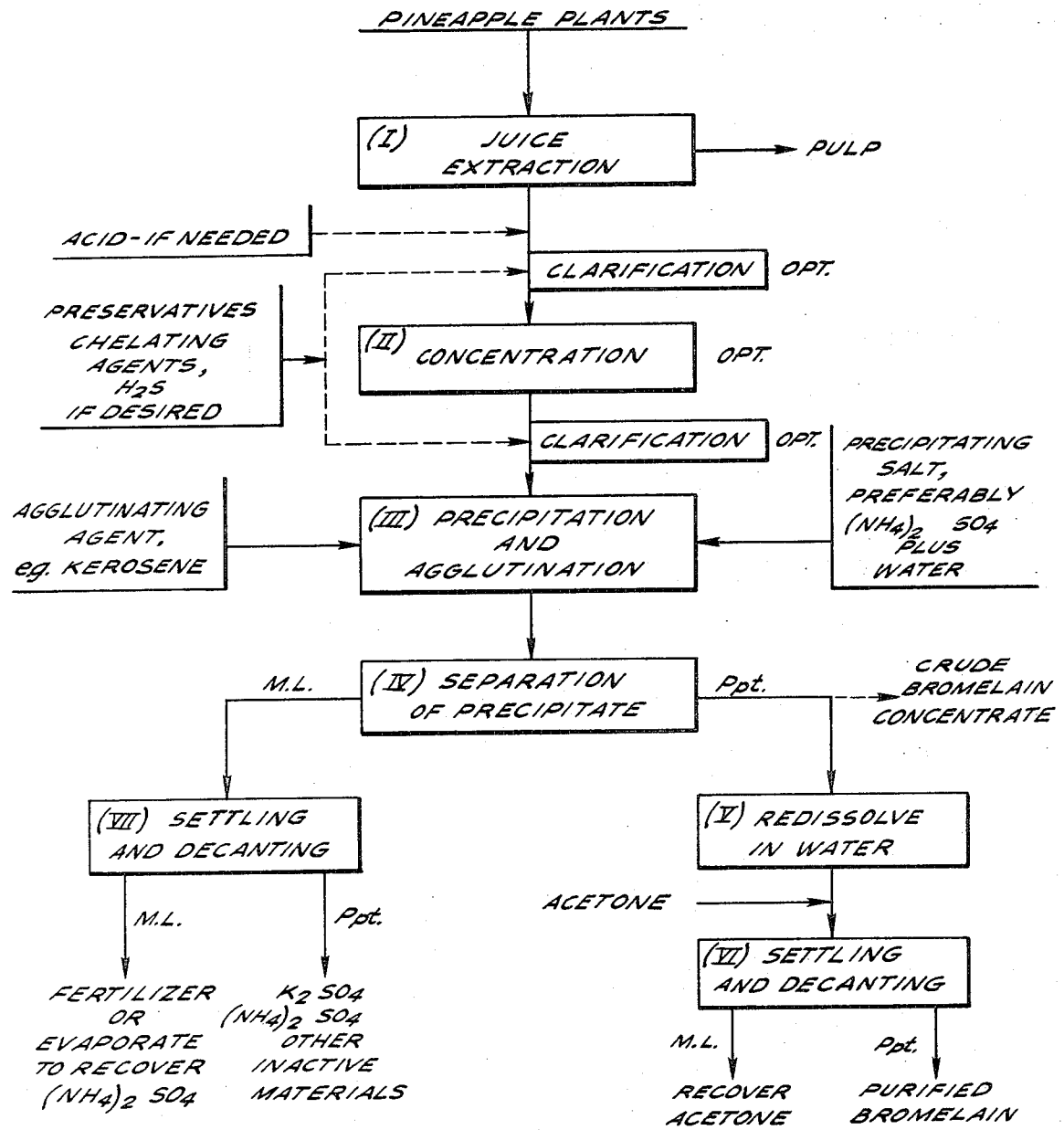

3,817,834
RECOVERY OF SALTED-OUT PROTEINS
Clarence Walter Wilson, 1074 Galls Creek Road,
Gold Hill, Oreg. 97525
Continuation-in-part of application Ser. No. 68,870, Sept. 2, 1970, which is a continuation-in-part of application Ser. No. 643,231, June 2, 1967, both now abandoned. This application Oct. 24, 1972, Ser. No. 300,097
Int. Cl. C07g 7/02, 7/022, 7/00
U.S. Cl. 195—66 R      28 Claims

ABSTRACT OF THE DISCLOSURE

Proteins, e.g., enzymes, are often extracted from natural sources as colloidal sols in aqueous media. By the addition of inorganic salts such as ammonium sulfate, these sols can be broken and the protein recovered. However, this salt precipitation technique often yields a fine suspension of protein which is difficult to recover. According to the present invention, salt-precipitated proteins are economically and conveniently recovered by the addition of an organic agglutinating agent such as kerosene or acetone, which brings about a rapid agglomeration of the suspended protein material.

RELATED APPLICATIONS

This application is a continuation-in-part of Ser. No. 68,870, filed Sept. 2, 1970, now abandoned, which in turn is a continuation-in-part of Ser. No. 643,231, filed June 2, 1967, now abandoned.

BACKGROUND AND SUMMARY OF INVENTION

Many proteins, especially enzymes, are often recovered from natural sources in the form of an aqueous extract from which they are then coagulated by the addition of protein-precipitation salts such as ammonium sulfate, or of organic coagulants such as acetone or isopropanol. Organic coagulants do not function economically because large volumes thereof are required with attendant evaporation losses which cannot be economically avoided, considering the size of the handling equipment and the cumbersome manipulations of centrifuging, washing, drying and solvent recovery which are involved.

The salt precipitation technique is disadvantageous when used alone because large quantities of salt are required, and the resulting precipitate is slimy in nature and flocculates very slowly, requiring a substantial holding time before it can be separated. Moreover, the precipitate which ultimately flocculates and settles out is often heavily contaminated with the salt precipitant as well as other contaminants from the natural source. As a result it is generally not suitable for direct use in foods, but must first be purified and concentrated. Purification by the best method known (dialysis) is cumbersome, expensive and time consuming.

According to my invention, the principal difficulties involved in both the salt-precipitation and the organic coagulant methods are avoided. By using a small amount of an organic agglutinant (which may be, but is not necessarily, a conventional organic coagulant), I have found that the protein precipitated by conventional salting out techniques can be agglutinated into a cohesive, fluid mass which is easily recoverable by centrifugation or gravity settling, for example. This avoids the principal difficulty involved in the conventional salting out technique, while at the same time obviating the use of large amounts of organic coagulants. In a sense therefore, by combining the two procedures, the worst of each is eliminated. But this is not the entire sense of the invention, for the organic agglutinants of this invention are not coextensive with conventional organic coagulants, and the latter have never been effectively utilized in the small proportions employed herein.

According to my agglutination recovery technique, prior to, during, or after the addition of precipitating salt to the aqueous protein solution or sol, a relatively small quantity of an at least partially immiscible, liquid organic agglutinating agent is added to the system, sufficient to form a separate organic liquid phase. The resulting multi-phase system is then stirred or agitated for a sufficient time to permit the precipitated protein to become wetted and agglomerated by the organic phase. The agglutinated protein is then separated by settling or centrifuging, and the crude protein concentrate is separated from the agglutinating agent.

In the preferred modification of the invention an agglutinating agent of lower specific gravity than the aqueous phase is employed. The resulting agglutinated protein phase can then be floated to the surface of the aqueous phase.

DETAILED DESCRIPTION

For an exemplary description of the invention, reference is made to the accompanying drawing which is a schematic flow diagram of the process. The basic raw material of this example consists of any or all of the vegetative portions, i.e., root, stem and leaves, of members of the plant family, Bromeliaceae. These vegetative portions all contain bromelain in varying amounts. The fruit also contains bromelain, but is normally harvested for its more valuable food purposes. The plants themselves become exhausted as economical fruit producers after about two growing seasons, and have heretofore been destroyed and replanted to maintain acceptable fruit quality. My process provides an economical use for the exhausted plants.

The most desirable portion of the plant from the standpoint of enzyme concentration is the stem tissue. The highest concentration of enzyme occurs in the mature stele, or central portion of the stem, particularly the lower portion thereof. If maximum yields of enzyme are desired per ton of raw material it may hence be desirable to strip the leaves, sucker stems and roots from the plant, and even pare off the epidermal stem layer. However, in view of the expense involved in these operations, and other features peculiar to my recovery process, I have found that it is entirely feasible and preferable in most cases to utilize the entire vegetative plant; root, stem and leaves. Although this results in a juice of lower initial enzyme concentration, this disadvantage is largely overcome by virtue of the preferred juice concentration step. Moreover, the juice from the leaves is relatively rich in malic and citric acids, and the acidity contributed to the total juice extract is such that I am able in most cases to avoid any addition of extraneous acids, as is normally required to adjust the stem juice to optimum pH levels of about 3.5–5.5 for maintaining maximum enzyme stability and activity.

Step (I)—Juice Extraction

The pineapple plants, or the desired portions thereof, are subjected to conventional crushing, pressing and shredding operations, as for example in a roller type press such as a sugar cane mill. Screw type presses may also be used. Optimum results are obtained when the operations of crushing, shredding and pressing are performed. The yield of juice (of about 7–10% solids content) is normally about 100–125 gallons per ton of plant tissue.

The raw juice from the press normally contains dirt, fibrous and starchy materials and other coarse solids which may tend to be troublesome in the subsequent concentration step. A superficial clarification may hence be performed at this stage by settling or light centrifuging.

It may also be desirable, particularly if leaf tissue was not included in the raw material, to add sufficient acid, e.g., sulfuric acid, to reduce the pH of the juice to about 3.5–5.5. A preservative reducing agent such as sodium metabisulfite may also be added in amounts of about 100–2,000 p.p.m., particularly in cases where the juice is to be stored for any appreciable time. Other reducing agents such as hydrogen sulfide may also be employed. It will be understood that these reducing agents are desirable in order to prevent oxidative deactivation of the enzyme.

Since hydrogen sulfide, and also the sulfur dioxide generated from sodium bisulfite, tend to volatilize during the subsequent evaporative concentration step, it may be desirable to use in addition to, or instead of, such volatile reducing agents a non-volatile metal chelating agent such as salts of ethylenediaminetetraacetic acid (Versene CA) in amounts of about 25–75 p.p.m. Such non-volatile complexing agents form soluble complexes with heavy metals in the juice and thereby reduce the tendency of such metals to promote oxidation by catalysis.

It will be understood that the steps of clarification, addition of acid, and addition of preservatives and chelating agents may be performed in any desired order.

Step II—Concentration

This preferred but optional step may be performed using conventional methods such as vacuum evaporation or freezing. Vacuum evaporation at temperatures below about 150° F., preferably below 130° F., is the preferred method. For best results the juice should be concentrated to a solids content of at least about 20%, preferably about 40–60% by weight, but any degree of concentration is economically beneficial.

Following the concentration step it is normally desirable to subject the cloudy juice to a more complete clarification, as by settling, filtration or centrifuging, to remove the more finely divided suspended solids including cellulosic, starchy and pectinous materials which may have been present in the fresh juice, or precipitated during concentration. If filtration is employed, a suitable filter aid such as diatomaceous earth may be added. Additional preservatives and/or chelating agents may also be added at this point if desired, particularly if the concentrated juice is to be stored for any length of time before proceeding with the enzyme recovery steps.

Step III—Precipitation and Flocculation

The primary precipitation of active enzyme material is effected by adding to the juice a sufficient quantity of any of the well known protein-precipitating salts such as ammonium sulfate, sodium sulfate, magnesium sulfate or the like known protein salting out agents. Preferably, when ammonium sulfate is the salt, and when a substantially concentrated juice is employed, the salt is added as a saturated solution in water in amounts sufficient to provide a final mixture, the water content of which is about 50–80% saturated with respect to the salt. Optimum proportions of the other salts will vary, as is known in the art. When a natural strength, or only slightly concentrated, juice is employed, the salt may advantageously be added as a solid.

Upon adding the salt solution (e.g., ammonium sulfate) to a concentrated juice, the following phenomena occur: (1) a finely-divided precipitate of active enzyme material forms at a fairly rapid rate, e.g., within 15 seconds to a few minutes; (2) potassium sulfate, and probably other inactive materials, are precipitated at a slower rate, but precipitation is appreciable at the end of two minutes and increases with increasing time until equilibrium is reached. If, for example, a half hour is allowed to elapse before the precipitate is separated from the mother liquor, a heavily contaminated product will be obtained. Better results are obtained by quickly centrifuging the mixture, but even under the best conditions contamination by both potassium sulfates and ammonium sulfate continues high. Use of other precipitating salts cause similar problems.

If the precipitating salt is added to a concentrated juice as a solid, the problems are intensified for precipitation of potassium sulfate appears to be hastened by the presence of the crystalline salt. Also the time required to dissolve sufficient of the ammonium (or other) sulfate required to precipitate the proteinaceous matter is sufficient to bring potassium sulfate precipitation to equilibrium.

It will be apparent from the foregoing that active enzyme material can be recovered from the concentrated juice by salt-precipitation alone. However, such recovery is difficult, time-consuming and expensive, and nearly always yields a product of lower activity and purity than can be obtained much more rapidly and easily by using, the agglutination agents, which forms the most unique aspect of my invention.

These agglutinating agents may be added prior to, simultaneously with, or after the precipitating salt is added to the protein sol. Suitable amounts may range between about 0.1% and 30%, preferably 1–10% by volume of the total aqueous mixture. Generally, it is desirable to use the minimum amount needed to (1) form a separate liquid phase, and (2) sufficiently wet all of the precipitated protein. The "separate liquid phase" referred to is not necessarily a continuous, visually identifiable liquid phase; it may in many instances consist of no more than a coating on the protein particles, sufficient to cause them to agglomerate into a semi-liquid mass. In other cases however, as where an excess of agglutinating agent is employed, the protein will appear as an identifiable semi-solid phase usually subjacent to a visually identifiable liquid organic phase.

I am unable to explain fully and with certainty the action of the agglutinating agents. It does appear however that they all exert a selective wetting and agglomerating action upon proteinaceous materials. The observed result is that substantially immediately, i.e., within about 0.5–5 minutes, after adding the agglutinating agent to the aqueous mixture and shaking or mixing briefly, a flocculent precipitate of protein material forms which rapidly coalesces with the organic phase. The agglomerated organic liquid-semi-solid phase is then easily separated by gravity from the aqueous phase.

The term "agglutinating agent" used herein is intended to denote any liquid organic material, viscous or non-viscous, which wets the precipitated protein more strongly than does the aqueous salt phase, and causes the thus-wetted particles to agglomerate at a faster rate than they normally would in the aqueous salt phase. Operative requirements of such agents may be summarized as follows:

(1) liquidity at the contacting temperatures;
(2) at least partial insolubility in the aqueous phase;
(3) a specific gravity sufficiently above or below that of the aqueous liquid phase to permit ready separation therefrom;
(4) chemical compatibility in the sense of not prohibitively degrading the activity or altering the essential chemical identity of the enzyme or other protein to be recovered; and
(5) sufficient lipophilic character to selectively wet the protein and thus displace inorganic salt solution therefrom.

Operative compounds include aliphatic, cycloaliphatic and aromatic hydrocarbons, esters, ketones, alcohols, ethers, nitriles, halo-hydrocarbons, and the like, having from 1–40, preferably 3–20, carbon atoms. Specific examples are as follows, exemplary preferred compounds being indicated by the notation (P):

A. Hydrocarbons:
- Benzene (P)
- Toluene
- Xylenes
- Cumene
- Ethylbenzene
- Cymenes
- Cyclohexane
- Cyclopentane
- Cyclohexene
- Gasoline
- Turpentine
- Petroleum ether
- Kerosene (P).
- Mineral oil (P).
- Propane.
- Butanes.
- Pentanes.
- Hexanes.
- Heptanes.
- Octanes.
- Nonanes.
- Decanes.
- Olefins.
- Terpenes.

B. Halohydrocarbons:
- Chlorobenzene
- p-Chlorotoluene
- Chloroform
- Methyl chloride
- Ethyl chloride
- Ethyl bromide
- Methyl chloroform.
- Carbon tetrachloride.
- Methylene chloride.
- Ethylene chloride.
- Propylene chloride.

C. Alcohols:
- Ethanol
- n-Propanol (P)
- Isopropanol
- n-Butanol
- Isobutanol
- tert Butanol
- n-Pentanol
- Isopentanol.
- n-Hexanol.
- n-Heptanol.
- n-Octanol.
- Benzyl alcohol.
- Phenylethyl alcohol.
- Cyclopentanol.

D. Ethers:
- Diethyl ether
- Methyl ethyl ether
- Ethyl isopropyl ether
- n-Propyl ether.
- n-Butyl ether.
- Methyl phenyl ether.

E. Esters:
- Methyl acetate (P)
- Ethyl acetate
- Ethyl propionate
- Ethyl formate
- Isopropyl acetate.
- Isobutyl acetate.
- n-Amyl acetate.
- Isoamyl acetate.

F. Ketones and aldehydes:
- Acetone (P)
- Methyl ethyl ketone (P)
- Methyl isobutyl ketone
- Cyclohexanone
- Acetaldehyde.
- Propionaldehyde.
- Benzaldehyde.

G. Nitriles:
- Acetonitrile
- Propionitrile
- Butyronitrile
- Valeronitrile.
- Benzonitrile.

H. Sulfur compounds:
- Carbon disulfide
- Mercaptans
- Thioethers
- Diethylsulfone.
- Diethyl sulfoxide.
- Thiophene.

J. Heterocyclic compounds:
- Pyrrole
- Furan
- Furfural
- Pyrrolidine
- Piperidine.
- Morpholine.
- 1,4 dioxane.

Mixtures of the foregoing compounds may also be employed. In fact, mixtures of highly water-insoluble materials such as hydrocarbons with small amounts of highly water-soluble materials such as acetone or isopropanol, constitute a preferred class of agglutinating agents. Compounds insoluble, or difficultly soluble in water, when used alone are often slow in their agglomerating action. The water-soluble material appears to act as a "bridging" agent between the enzyme particles and the water-insoluble agent.

Many liquids, e.g., paraffinic hydrocarbons, which wet the protein with sufficient strength to float it to the surface under the influence of gravity are torn away from the protein when the mixture is centrifuged at e.g., 500 or more times gravity, so that the oil goes to the center and protein to the outside of the centrifuge. This tendency can be overcome by mixing such weakly attached liquids with any desired proportion, preferably 25–100%, of a strongly attaching liquid such as acetone or isopropanol, or other relatively water-soluble liquid.

In addition, to their beneficial mechanical effect of facilitating separation of the protein, the agglutinating agents also appear to displace inorganic salts, e.g., ammonium sulfate, therefrom so that a product of greater purity and activity (in the case of enzymes) is obtained.

In the extraction of bromelain from pineapple plant juice, certain of the agglutinating agents, particularly the oxygenated, hydrophyllic materials such as acetone, n-propanol, or methyl acetate, whether used alone or in conjunction with a hydrophobic liquid such as hydrocarbons, appear to contribute an additional benefit of extracting from the plant juice an unknown activator which materially increases the activity of the recovered enzyme. This was demonstrated experimentally as follows:

An aqueous ammonium sulfate-concentrated juice mother liquor, from which the precipitated enzyme had previously been separated by flotation with a hydrocarbon agglutinating agent, was extracted with acetone, and the acetone was evaporated from the resulting extract. The remaining aqueous extract was then added to a quantity of previously recovered and repurified enzyme which originally had an activity of about 23,000 M.C.U. per gram, but which had become partially deactivated during long storage to an activity of about 8,000 M.C.U. per gram. The solid enzyme went into solution, and a portion of the solution was tested for activity. The results indicated a partial recovery of activity to a level of about 15,000 M.C.U. per gram. It is thus evident that an acetone-extractable activator is present in the plant juice, a substantial portion of which is not recovered by hydrocarbon agglutinating agents alone. To obtain maximum recovery of this activator along with the enzyme, I hence prefer to employ a substantial quantity, e.g., 2–20% by volume of the aqueous phase, of an oxygenated, appreciably water-soluble, hydrophyllic agglutinating agent having from 3 to about 10 carbon atoms.

The specific gravity of the salt-protein sol mixtures utilized herein normally ranges between about 1.15 to 1.25, which is higher than that of most organic liquids. Agglutinating agents which cause the precipitated protein to settle are hence fairly rare. The principal examples are the halohydrocarbons, e.g., chloroform and carbon tetrachloride. These materials have been found to function most effectively when admixed with 10–40% by volume of a water-soluble compound such as acetone.

The preferred agglutinating agents are those which have a lower specific gravity than the aqueous salt phase. In these cases it is found that the agglutinated protein can be rapidly floated to the surface of the aqueous phase. When plant juices form the protein source, other more slowly precipitated solid phases, such for example as potassium sulfate may settle to the bottom of the aqueous phase.

Although some of the agglutinating agents employed herein, e.g., isopropanol, have previously been used as precipitants for proteins in aqueous solutions, it will be apparent that the present invention involves more than the mere use of two known protein precipitants in combination, each functioning in its known manner. Essential to the present invention is the presence to a separate liquid phase of organic agglutinating agent. In the case of water-insoluble agglutinating agents such as hydrocarbons, very small proportions thereof will suffice to form a separate phase, whereas in the case of water-soluble materials such as acetone or isopropanol somewhat larger minimum amounts will be required, sufficient to over-saturate the aqueous salt phase, the excess being "salted out" to form a separate phase.

Step IV—Separation of Precipitate

This step need not be described in detail since it involves conventional techniques of centrifuging or settling. Preferably the separation is performed within about 1–30 minutes after completion of precipitation and agglutination in Step III. The prefererd method is centrifuging at, e.g., 100–1,000 times gravity. The crude bromelain precipitate so recovered can be easily separated from volatile agglutinating agents such as acetone or isopropanol by evaporation at temperatures below about 150° F. Nonvolatile agglutinating agents can be removed by solvent extraction with acttone, or other volatile solvents if desired. The resulting crude bromelain concentrate is suitable for many commercial applications without further purification.

In many cases, the precipitated protein can be easily separated from the excess agglutinating agent and retained mother liquor by working the semi-fluid precipitate in the same manner that butter is worked to rid it of retained buttermilk, or salted out soap is worked to rid it of brine.

Steps V and VI—Purification

For applications requiring maximum purity and lightness of color, the crude bromelain concentrate, with its associated agglutinating agent, may be redissolved in water. Normally, no more than about 2 to 4 pints of water per pound of concentrate are required. The enzyme goes into solution, any occluded insoluble matter becomes suspended, while any insoluble agglutinating agent forms a separate liquid phase which may be separated by settling or centrifuging. Acetone, methanol, ethanol, or any conventional low-dielectric, water-soluble protein-coagulating solvent is then added in amounts of about 1.5 to 5 volumes per volume of aqueous solution to effect precipitation of the enzyme. The final purified enzyme is recovered by settling or filtration, and the organic precipitant is recovered from the mother liquor by conventional methods such as distillation.

Step VII—Disposition of Mother Liquor

The aqueous mother liquor from Step IV may be utilized as such for fertilizer if desired. Alternatively, it may be allowed to stand for several hours to several days, to allow the insoluble inorganic salts, principally potassium sulfate, to settle out. Separation is accomplished by decantation or centrifuging. The remaining mother liquor may be used as fertilizer, or it may be partially evaporated to reform a substantially saturated ammonium sulfate solution for re-use in Step VIII, or to crystallize ammonium sulfate. Normally, at least a portion of the mother liquor must be bled from the process in order to prevent the build-up of soluble sugars, etc. in the system.

In all of the foregoing description, it will be understood that the various steps, except concentration Step II, are preferably carried out at ambient temperatures of about 50–100° F.

While the foregoing description has centered about the recovery of bromelain from pineapple plants, it will be apparent that the heart of the process, steps III and IV, can with minor modifications be applied to the recovery of other proteins, including other enzymes, from a great variety of natural sources. The term "protein" as employed herein is intended to designate any proteinaceous material, including protein hydrolyzates, of sufficient molecular size to be salted out of their aqueous sols.

Proteins which may be recovered herein run the entire gamut of simple enzymes, albumins, globulins, glutelins, protamines, prolamines, histones and their hydrolyzates including proteoses and some peptones. Conjugated proteins, including nucleoproteins, phosphoproteins, and lipoproteins may also be recovered. It is obviously impossible to enumerate all of the specific proteins, but some of the more important exemplary species contemplated herein include papain, amylase, invertase, pectinesterase, asparaginase, pepsin, trypsin, erepsin (all enzymes), blood and egg albumin, lactalbumin, serum and seed globulins (soy, peanut, etc.), wheat glutenin and gliadin, hemoglobin, chlorophyll, milk casein, saliva mucin, gelatin, liver histones, and a great variety of others. Since methods for recovering these materials from their natural sources in the form of aqueous sols are well known, they need not be described herein.

The following examples are cited to illustrate certain preferred modes of procedure, and the results obtainable, but are not to be construed as limiting in scope:

EXAMPLE 1—BROMELAIN RECOVERY (A) Juice Extraction

A quantity of fresh, whole pineapple plants was run through a commercial sugar cane mill, and the expressed juice was strained to remove large particles. To the strained but cloudy juice was added 1000 p.p.m. of sodium metabisulfite and 50 p.p.m. of the sodium-calcium salt of ethylenediamine tetraacetic acid (Versene CA) to sequester heavy metals. The resulting juice was allowed to settle for 24 hours and then decanted. Solids content was about 8% by weight.

(B) Juice Concentration

The superficially clarified juice was concentrated by evaporation at 135° F. in a vacuum concentrator to a solids content of 47% by weight. Each 100 liters of fresh juice yielded 14 liters of concentrate having an activity of 545 M.C.U per ml, as compared to about 140 M.C.U. per ml. of fresh juice. ("M.C.U." refers to milk clotting units; one M.C.U. is the amount of enzyme that will just cause clotting in one minute at 37.5° C. of 1 ml. of a 5% skim milk solids solution adjusted to a pH of 5.3.)

(C) Precipitation and Agglutination

To 400 ml. of the juice concentrate was added 60 ml. of isopropanol and 40 ml. of a saturated aqueous solution of ammonium sulfate. The resulting mixture was agitated briefly to mix the three liquids. In less than one minute a flocculent precipitate appeared, and the mixture was then spun in a centrifuge for 4 minutes at 1000 G.

(D) Recovery and Purification

The agglutinated enzyme appeared on the centrifuged mixture as a brown, semifluid supernatant layer amounting to about 15 ml. It was skimmed off with a spoon and dried at about 100° F. The resulting brown sugary solid weighed about 9 gms., and had an activity of about 12,000 M.C.U. per gram. This product, containing some ammonium sulfate, is suitable for technological uses where good color and maximum purity are not required. Overall recovery of enzyme activity from the fresh juice with about 27%. This relatively low recovery is due in part to the denaturing effect of the isopropanol. Other agglutinating agents such as hydrocarbons, ketones and esters give relatively better recoveries.

EXAMPLE 2

Parts (C) and (D) of Example 1 were repeated using 60 ml. of acetone instead of isopropanol. But to obtain a similar floating precipitate, it was found necessary to use 600 ml. of the ammonium sulfate solution. The activity of the resulting product was substantially higher, as was the net recovery of enzyme activity from the concentrated juice.

EXAMPLE 3

To 5 ml. of the juice concentrate prepared in Example 1 was added 5 ml. of saturated ammonium sulfate solution and 1 ml. of benzene. After shaking the mixture briefly and allowing it to stand, a floating precipitate of benzene and agglutinated enzyme formed, but at a somewhat slower rate than was observed with isopropanol or acetone.

EXAMPLE 4

Example 3 was repeated using 1 ml. of kerosene in place of the benzene. The results were substantially the same.

EXAMPLE 5

Example 3 was repeated using a mixture of 1 ml. of benzene and 0.5 ml. of acetone instead of benzene alone. This mixture appeared to function better than either material alone, in that agglutination and separation was more rapid than with benzene alone, and less ammonium sulfate was required than when acetone was used.

EXAMPLE 6

Example 3 was repeated using 1 ml. of n-propanol instead of benzene. Rapid agglutination occurred, but flotation was somewhat slower than was observed in Example 1 using isopropanol.

EXAMPLE 7

Example 3 was repeated using a mixture of 0.4 ml. of acetone and 0.1 ml. of n-propanol, instead of benzene. Here again, the mixture appeared to function better than either material alone. Flotation was more rapid than was observed in Example 6 using n-propanol alone, while less ammonium sulfate was required than was needed when using acetone alone.

EXAMPLE 8

Ethanol was found to yield almost no floating precipitate when used under the conditions of Example 3. However, a mixture of 5 ml. of the concentrated juice, 5 ml. of ammonium sulfate solution and 6 ml. of ethanol did yield a good collar of floating precipitate. Ethanol is hence operative, but is disadvantageous in that large amounts are required in order to form a separate phase.

EXAMPLE 9

This example illustrates a preferred practice of the invention using small amounts of a water-soluble agglutinating agent and larger amounts of an insoluble agent.

The following mixture was prepared:

| | Ml. |
|---|---|
| Juice concentrate (Example 1) (total M.C.U.—54,500) | 500 |
| Light mineral oil | 20 |
| Acetone | 10 |
| Saturated $(NH_4)_2SO_4$ solution | 100 |

The mixture was shaken vigorously for 15 seconds and centrifuged at once for 4 minutes at a relative centrifugal force of 525 times gravity. Floating on top of the clear brown mother liquor was a dark brown, semi-solid layer that had a volume (not including that of the contained oil) of 5.3 ml. This precipitate was dissolved in 8 ml. of water and the solution was separated from the floating oil. 0.05 ml. of the solution was taken for assay and indicated a recovery of 53,400 M.C.U. or 98% of the activity introduced in the juice concentrate.

To the remainder of the solution was added 30 ml. of acetone, the precipitate was allowed to settle and the supernatant decanted. The residue was taken up in 10 ml. of water, precipitated with 20 ml. of acetone and the precipitate was collected on a filter. The residue on the filter was dehydrated by washing with acetone and the product was dried in a vacuum oven at low temperature. 1.782 g. of a cream colored powder was recovered which had an activity of 23,000 M.C.U./g. This represented recovery of 75% of the enzyme activity introduced in the plant juice concentrate.

EXAMPLE 10

To 50 ml. of the natural strength plant juice derived from step (A) of Example 1 were added:

| | | |
|---|---|---|
| Acetone | ml. | 5 |
| Kerosene | ml. | 5 |
| Crystalline ammonium sulfate | gm. | 25 |

The resulting mixture was put into a wide mouthed bottle, stoppered and rotated slowly on its side. As the ammonium sulfate dissolved, the enzyme precipitated and became entangled in the floating oil phase, from which it was recovered together with the floating oil by skimming.

In a cyclic process, the aqueous mother liquor remaining after separation of the enzyme is allowed to stand for, e.g., 24–48 hours, then decanted from the settled solids including potassium sulfate, and concentrated by evaporation to a solids content of e.g., about 70–90% by weight. The bulk of this concentrate can then be recycled to the enzyme precipitation step with any required make-up of ammonium sulfate. This procedure is advantageous in that (1) it gives a higher recovery of enzyme activity by virtue of eliminating the juice concentration step (which, as shown in Example 1, results in a substantial destruction of the heat-labile enzyme fraction), and (2) boiling at atmospheric pressure can be employed in concentrating the mother liquor, while low-temperature vacuum evaporation is required for concentrating the juice.

EXAMPLE 11—WHEY PROTEINS (LACTALBUMIN)

A quantity of a 2:1 concentrate of skim milk was acidified by addition of dilute acetic acid until thickening became evident. The acidified milk concentrate was warmed while being gently stirred and the coagulated casein was strained from the whey. The whey was clarified by addition of small amounts of aluminum sulfate and filtered.

(A) To 50 ml. of this whey concentrate was added 100 ml. of saturated ammonium sulfate solution. A protein precipitate, mainly lactalbumin, formed promptly. At the end of 5 minutes the precipitate was still homogeneously suspended throughout the system.

(B) The above was repeated except that 6.5 ml. of acetone was added to the whey concentrate before the ammonium sulfate was added. In less than a minute after addition of the ammonium sulfate solution large flocs were seen rising above a clear mother liquor and at the end of the 5 minute observation period, the precipitated protein had collected as a sticky, cohesive, yellowish supernatant layer with a volume of about 2 ml.

EXAMPLE 12

(A) The manipulations of Example 11–(A) were repeated except that saturated magnesium sulfate solution was substituted for the ammonium sulfate solution. The results were substantially the same at those from 11–(A); the precipitate appeared to be homogeneously suspended after 5 minutes.

(B) At the end of the 5 minute observation period, the suspension was centrifuged for 4 minutes at 325 times gravity. A loose collar of precipitate had risen to occupy about 50% of the volume of the system. The liquid below the collar was opalescent, showing the presence of suspended matter.

(C) To this heterogeneous mixture was then added acetone equal to ⅕ the volume. The tube was shaken to emulsify the acetone and bring the precipitate particles into contact with the acetone droplets. Centrifuging was repeated and the precipitated protein rose to form a thin layer supernatant to a clear mother liquor.

EXAMPLE 13—PAPAIN 1 gram of crude papain was suspended in 100 ml. of water and, at the end of a half hour, was filtered. The yellow filtrate was divided into two equal portions. To one portion was added twice its volume of saturated ammonium sulfate. To the other was added 20 ml. of acetone and the same volume of saturated ammonium sulfate as was added to the first portion. Both portions were thoroughly agitated for about 15 seconds and allowed to stand for 5 minutes. At the end of this time the yellow precipitate in the first batch appeared to be evenly suspended throughout the system. The precipitate in the batch to which the acetone had been added had risen to form a collar of thick liquid below a layer of aqueous acetone. The volume of the collar was less than 10% of the total volume of the system. The acetone layer was poured off and the clear mother liquor was discarded. The collar was dissolved in 50 ml. of water and was found to rapidly liquefy gelatine.

EXAMPLE 14—PEANUT GLOBULIN

About 35 g. of peanut oilmeal was agitated for an hour with 250 ml. of a 5% NaCl solution. The extract containing the globulin was recovered by filtration and two 100 ml. portions were measured out.

To portion "A" was added with gentle agitation an equal volume of saturated ammonium sulfate solution. A copious flocculent precipitate formed which slowly settled to the bottom of the container.

Portion "B" was treated in exactly the same manner as portion "A" except that 20 ml. of methylethyl ketone was added to the extract before the ammonium sulfate solution. The precipitate that formed in this case rapidly formed a curd that rose to the surface and there mingled with the small ketone phase which had also risen. Slow agitation of the surface layer caused the curd particles to cohere, forming a clot that could be lifted into another container for washing with 50% acetone to remove occluded ammonium sulfate.

It will be apparent from the foregoing description that the critical novel aspects of my invention reside in using only a small proportion of organic agglutinating agent, and a large, "salting out," proportion of inorganic salt. The proportion of agglutinating agent should be only sufficient to provide a separate organic phase, which exclusive of the occluded protein, amounts to about 0.01% to 10%, preferably 0.1% to 5%, by volume of the liquid system. The inorganic salt should be used in proportions sufficient to provide about 40–100%, preferably about 50–90%, saturation of the aqueous phase at operating temperatures. Operative protein-precipitating salts are well known in the art, and comprise primarily the inorganic alkali metal, alkaline earth metal and ammonium salts which do not denature the protein material concerned, and are water-soluble at least to the extent of about 1 M at 60° F. Sulfates are generally preferred, but chlorides, bromides and the like may also be utilized.

Having fully described my invention, it is to be understood that I do not wish to be limited to the details described above. The true scope of the invention is intended to be defined by the following claims.

I claim:
1. A method for recovering a protein material from an aqueous sol thereof, which comprises:
    (1) mixing said sol with (a) sufficient of a water-soluble, non-denaturing, protein-precipitating inorganic alkali metal, alkaline earth metal or ammonium salt to provide about 40–100% saturation of the resulting aqueous phase with resultant salting out of said protein material, and (b) sufficient of a liquid organic agglutinating agent to form a separate organic liquid phase mounting to about 0.01% to 10% by volume of the resulting liquid system, said agglutinating agent being (a) at least partially immiscible with the aqueous phase formed by addition of said inorganic salt to said sol, (b) of different specific gravity than said aqueous phase, and (c) capable of selectively wetting and retracting from said aqueous phase the protein material precipitated by said inorganic salt;
    (2) agitating the resulting mixture to effect agglutination and withdrawal of salted-out protein material from the aqueous phase to said organic phase;
    (3) separating the resulting organic phase from the remaining aqueous phase; and
    (4) recovering protein material from the separated organic phase.
2. A method as defined in claim 1 wherein said agglutinating agent has a lower specific gravity than the aqueous phase, and wherein the organic phase is separated in step (3) by flotation.
3. A method as defined in claim 1 wherein said agglutinating agent comprises a liquid hydrocarbon.
4. A method as defined in claim 1 wherein said agglutinating agent comprises an aliphatic alcohol having at least 3 carbon atoms.
5. A method as defined in claim 1 wherein said agglutinating agent comprises an aliphatic ketone.
6. A method as defined in claim 1 wherein said agglutinating agent comprises a mixture of a liquid hydrocarbon and one or more organic compounds selected from the class consisting of aliphatic ketones and aliphatic alcohols having at least 3 carbon atoms.
7. A method as defined in claim 1 wherein said protein material is an enzyme.
8. A method as defined in claim 7 wherein said enzyme is papain.
9. A method as defined in claim 1 wherein said protein material is a globulin.
10. A method as defined in claim 1 wherein said protein material is an albumin.
11. A method for recovering bromelain from juice extracted from the vegetative tissue of pineapple plants, which comprises;
    (1) mixing said juice with a protein-precipitating inorganic salt and with sufficient of a liquid organic agglutinating agent to form a separate organic liquid phase, said agglutinating agent being (a) at least partially immiscible with the aqueous phase formed by addition of said inorganic salt to said juice, (b) of different specific gravity than said aqueous phase, and (c) capable of selectively wetting and retracting from said aqueous phase the bromelain precipitated by said inorganic salt;
    (2) agitating the resulting mixture to effect aggultination and withdrawal of salt-precipitated bromelain from the aqueous phase to said organic phase;
    (3) separating the resulting organic phase from the remaining aqueous phase; and
    (4) recovering bromelain from the separated organic phase.
12. A method as defined in claim 11 wherein said extracted juice is concentrated to a solids content of at least about 20% by weight prior to step (1).
13. A method as defined in claim 11 wherein said extracted juice is utilized in step (1) without substantial prior concentration.
14. A method as defined in claim 11 wherein said juice is extracted from vegetative tissue including leaf tissue, whereby the resulting juice has a relatively low pH, favorable to the preservation of enzyme activity.
15. A method as defined in claim 11 wherein said protein-precipitating salt used in step (1) is ammonium sulfate.
16. A method as defined in claim 11 wherein said agglutinating agent has a lower specific gravity than the aqueous phase, and wherein the organic phase is separated in step (3) by flotation.
17. A method as defined in claim 11 wherein said agglutinating agent comprises a liquid hydrocarbon.
18. A method as defined in claim 11 wherein said agglutinating agent comprises an aliphatic alcohol having at least 3 carbon atoms.
19. A method as defined in claim 11 wherein said agglutinating agent comprises an aliphatic ketone.
20. A method as defined in claim 11 wherein substantially natural strength juice is utilized in step (1), and wherein said remaining aqueous phase from step (3) is concentrated and recycled at least in part to step (1) to supply said inorganic salt.
21. A method as defined in claim 11 wherein said agglutinating agent comprises an ester of an aliphatic carboxylic acid.
22. A method for recovering bromelain from the concentrated juice of the vegetative tissue of pineapple plants which comprises:
    (1) mixing said concentrated juice with (a) sufficient of a protein-precipitating inorganic salt to effect precipitation of bromelain, and (b) sufficient of an at least partially immiscible liquid organic agglutinating agent to form a separate organic liquid phase, said agglutinating agent comprising an oxygenated, hydrophyllic, water-soluble compound having from 3 to 10 carbon atoms and being capable of selectively wetting the precipitated bromelain;
    (2) agitating the mixture sufficiently to effect a substantial wetting and agglutination of precipitated bromelain with said agglutinating agent;

(3) separating the resulting organic phase of agglutinated bromelain plus agglutinating agent from the remaining aqueous phase; and (4) recovering a bromelain concentrate from said separated organic phase.

23. A method as defined in claim 22 wherein said agglutinating agent is first added to the juice, followed by addition of said inorganic salt.

24. A method as defined in claim 22 wherein said inorganic salt is first added to the juice, followed by addition of said agglutinating agent.

25. A method as defined in claim 22 wherein said inorganic salt and said agglutinating agent are added substantially simultaneously to the juice.

26. A method as defined in claim 22 wherein said organic phase is separated from the aqueous phase by a gravity separation carried out prior to the occurrence of any substantial precipitation and settling of non-agglutinated precipitate remaining in said aqueous phase.

27. A method as defined in claim 22 wherein said agglutinating agent is a mixture of an aliphatic ketone and a hydrocarbon.

28. A method as defined in claim 22 wherein said agglutinating agent is a mixture of an aliphatic mono-alcohol and a hydrocarbon.

References Cited
UNITED STATES PATENTS

| | | | |
|---|---|---|---|
| 2,520,076 | 8/1950 | Williams et al. | 260—112 R |
| 3,102,081 | 8/1963 | Faucett et al. | 195—68 |
| 3,592,737 | 7/1971 | Keay et al. | 195—66 R |
| 3,715,270 | 2/1973 | Suzuki et al. | 195—68 |

LIONEL M. SHAPIRO, Primary Examiner

U.S. Cl. X.R.

195—66 B; 260—112 R, 120, 122